April 24, 1956     J. T. CARLETON     2,743,152

VOLTAGE REFERENCE NETWORK

Filed March 26, 1953

INVENTOR
James T. Carleton.
BY
Ezra W. Savage
ATTORNEY

United States Patent Office 2,743,152
Patented Apr. 24, 1956

2,743,152
VOLTAGE REFERENCE NETWORK

James T. Carleton, Pittsburgh, Pa., assignor to Westinghouse Electric Corporation, East Pittsburgh, Pa., a corporation of Pennsylvania Application March 26, 1953, Serial No. 344,773

7 Claims. (Cl. 321—18)

This invention relates to voltage reference networks and more particularly to voltage reference networks for use in regulator systems.

Voltage reference networks have many applications, for instance, in regulator systems a variable signal proportional to the deviation of a quantity from its regulated value is compared with the output of a voltage reference network. In such a regulator system it is extremely important that the output voltage of the reference network remain substantially constant even though its input voltage varies in magnitude and frequency. If the output voltage of the reference network does not remain substantially constant, the accuracy of the overall regulator system is affected. That is, the regulator system is only as accurate as the accuracy of the voltage reference network incorporated therein. It is also important that the voltage reference network be substantially insensitive to the temperature of the air surrounding it.

An object of this invention is to provide a voltage reference network which has a substantially constant output voltage over a wide range of variation in the magnitude and frequency of its input voltage and over a wide range of variation in the temperature of the air surrounding the reference network, by so interconnecting a P-N junction diode with a simple saturable reactor that a substantially constant current flows through the P-N junction diode, to maintain a substantially constant voltage across the P-N junction diode.

Other objects of this invention will become apparent from the following description when taken in conjunction with the accompanying drawings in which.

Figure 1:
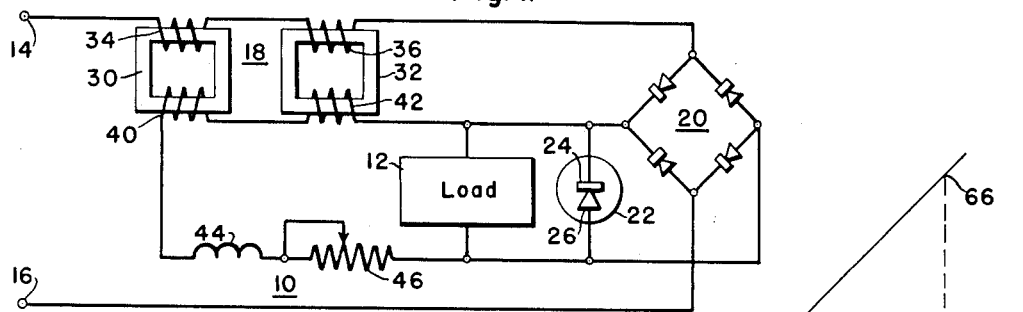
Figure 1 is a schematic diagram of circuits and apparatus illustrating an embodiment of the teachings of this invention.

Referring to Fig. 1 of the drawings there is illustrated a voltage reference network 10 embodying the teachings of this invention, the reference network 10 being disposed to maintain the voltage across a load 12 substantially constant even though the magnitude and frequency of the alternating current voltage applied to its input terminals 14 and 16 varies over a wide range. As will be explained more fully hereinafter, the voltage reference network 10 also maintains the voltage across the load 12 substantially constant even though there is a variation in the temperature of the air surrounding the reference network 10.

In general, the voltage reference network 10 comprises a simple series connected saturable reactor 18, a full-wave dry-type rectifier 20 for rectifying the output of the saturable reactor 18, and a P-N junction diode 22, having a base 24 and a collector 26, the P-N junction diode being so interconnected with the saturable reactor 18 that substantially constant current flows through the P-N junction diode 22 to thereby maintain a substantially constant voltage across the diode 22 and thus a substantially constant voltage across the load 12. In practice, the diode 22 may be for instance a germanium P-N junction diode or a silicon P-N junction diode. The reason that substantially constant current flows through the diode 22 over a wide range of variation in the magnitude and frequency of the alternating current voltage applied to the input terminals 14 and 16 will be explained hereinafter.

In particular, the saturable reactor 18 comprises two magnetic core members 30 and 32, both of which are constructed from magnetic core material. As illustrated, load windings 34 and 36 are disposed in inductive relationship with the core members 30 and 32, respectively. In order to rectify the alternating current flowing through the load windings 34 and 36 to thus produce a direct current output from the saturable reactor 18 the load windings 34 and 36 are connected in circuit relationship with the rectifier 20. Specifically the load windings 34 and 36 are connected in series circuit relationship with one another, one end of the series circuit being connected to the input terminal 14 and the other end of the series circuit being connected to one of the input terminals of the rectifier 20. The energizing circuit to the load windings 34 and 36 is completed by connecting the other input terminal of the rectifier 20 to the input terminal 16 of the reference network 10. On the other hand, the diode 22 is rendered responsive to the output current of the saturable reactor 18 by connecting the diode 22 across the output terminals of the rectifier 20.

In order to saturate the core members 30 and 32 a predetermined amount in accordance with the magnitude of the voltage across the P-N junction diode 22, control windings 40 and 42 are disposed in inductive relationship with the core members 30 and 32, respectively. As illustrated, the control winding 40 is wound oppositely from the control winding 42 so that voltages tending to be induced in the load windings 40 and 42, by the flow of alternating current through the load windings 34 and 36, cancel one another out. The control windings 40 and 42 are rendered responsive to the voltage across the diode 22 by connecting the control windings 40 and 42 in series circuit relationship with an inductance member 44 and a variable resistor 46 and by connecting this series circuit across the diode 22.

By interconnecting the inductance member 44 and the resistor 46 in the control winding circuit, the control winding circuit presents a high impedance to the alternating current tending to be induced in the control windings 40 and 42 due to the alternating current flowing through the load windings 34 and 36. Since the control winding circuit presents such a high impedance, the alternating current flowing through the load windings 34 and 36 has a substantially square wave shape. Such a square wave shape is desirable since the P-N junction diode 22 would clip off the tops of any peaked waves that would flow through the load windings 34 and 36 if the control winding circuit including the control windings 40 and 42 did not present a high impedance to alternating current tending to be induced in these control windings. If the diode 22 were to clip off the tops of such peaked waves, the accuracy of the voltage reference network 10 would be greatly impaired.

Although the inductance member 44 and the resistor 46 as shown in Fig. 1 are preferred, it is to be understood that the resistor 46 could itself by proper construction provide the high impedance for the control circuit. However, by also providing the inductance member 44, the resistance value and thus the size of the resistor 46 can be decreased. It is also to be understood, however, that by proper construction the control windings 40 and 42 of themselves might present a sufficiently high impedance, thus rendering it unnecessary to provide the inductance member 44 and the resistor 46.

Figure 2:
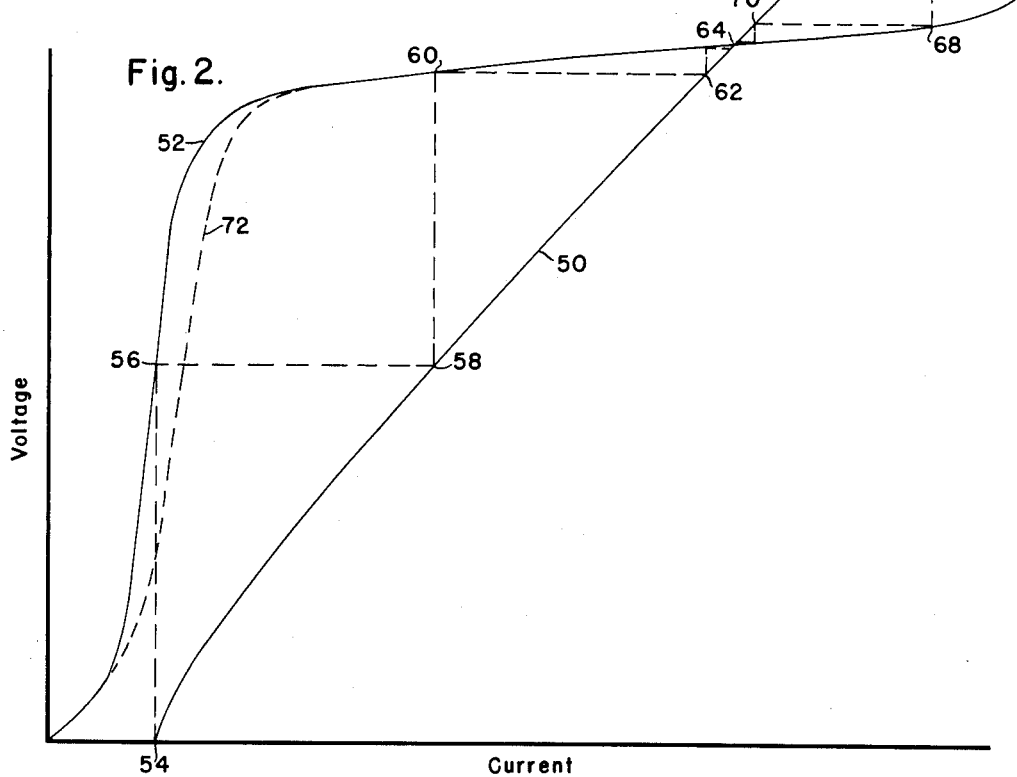
Fig. 2 is a graph illustrating the manner in which the apparatus illustrated in Figs. 1 and 3 functions.

The operation of the reference network 10 and the reason why it maintains a substantially constant voltage across the load 12 can be better understood by referring to Fig. 2 of the drawings in which:

A curve 50 represents the manner in which the voltage produced across the diode 22 as a result of the output current of the saturable reactor 18 varies with changes in the output current of the saturable reactor 18. On the other hand, the characteristic of the diode 22 itself is such that a curve 52 represents the manner in which the voltage across the diode 22 varies with changes in the magnitude of the current flow through the diode 22. It is to be noted that the curve 50 does not substantially vary its position as illustrated in Fig. 2 even though the magnitude and frequency of the voltage applied to the input terminals 14 and 16 varies. The reason the curve 50 does not change its position under such varying conditions is that in the simple saturable reactor 18 the alternating ampere turns of the load winding 34 are equal to the direct current ampere turns of the control winding 40 and the alternating current ampere turns of the load winding 36 are equal to the direct current ampere turns of the control winding 42. This is an essential feature in maintaining a substantially constant current flow through the diode 22 to thereby maintain a substantially constant voltage thereacross. It is to be noted that if such an equal ampere turn ratio did not exist, the positioning of a curve, corresponding to the curve 50, would vary in accordance with the magnitude and frequency of the voltage applied to the input terminals 14 and 16.

The operation of the reference network 10 can be better understood by considering that if the output current of the saturable reactor 18 has increased to a value as represented at 54, such a current flow through the diode 22 increases the voltage across the diode to a value as represented at 56. The voltage across the diode 22 as represented at 56 increases the magnetic saturation of the core members 30 and 32 due to the increased current flow through the control windings 40 and 42, to thereby increase the output current of the saturable reactor 18 until it reaches a value as represented at 58. Such an output current for the saturable reactor 18 flowing through the diode 22 effects a voltage across the diode of a magnitude as represented at 60. This increased voltage across the diode 22 then increases the magnetization of the core members 30 and 32 to thereby again increase the output current of the saturable reactor 18 so that it reaches a value as represented at 62. This increasing of the voltage across the diode 22 and this increasing of the output current of the saturable reactor 18 continues until the intersection point 64 of the curves 50 and 52 is reached. At this point the output current of the saturable reactor 18 remains substantially constant and the voltage across the diode 22 likewise remains substantially constant.

If, however, the output current of the saturable reactor 18 should ever increase to a value as indicated at 66, due to a sudden surge in the input voltage as applied to the terminals 14 and 16, the voltage across the diode 22 would immediately return to the value as indicated at 64. This can be better undertood by considering that an output current from the saturable reactor 18 of the magnitude as indicated at 66 flowing through the diode 22 would produce a voltage across the diode 22 of a value as indicated at 68. Such a voltage across the diode 22 would return the output current of the saturable reactor 18 to a value as indicated at 70. This action would then continue until the voltage across the diode 22 was returned to the value as indicated at 64.

As previously mentioned, the voltage across the load 12 remains substantially constant even though there is a variation in the temperature of the air surrounding the reference network 10. The reason for this is that the curve 50 does not substantially change its position when the temperature of the air surrounding the reference network 10 changes nor does the upper portion of the curve 52 change its position with changes in the temperature of the air surounding the reference network 10. For instance, with an increase in the temperature of the air surrounding the diode 22, the characteristic of the diode 22 itself is such that the voltage across the diode 22 varies with changes in the magnitude of the current flowing through it in accordance with a curve 72. As can be seen, the upper portion of the curve 72 is positioned the same as the upper portion of the curve 52.

Figure 3:
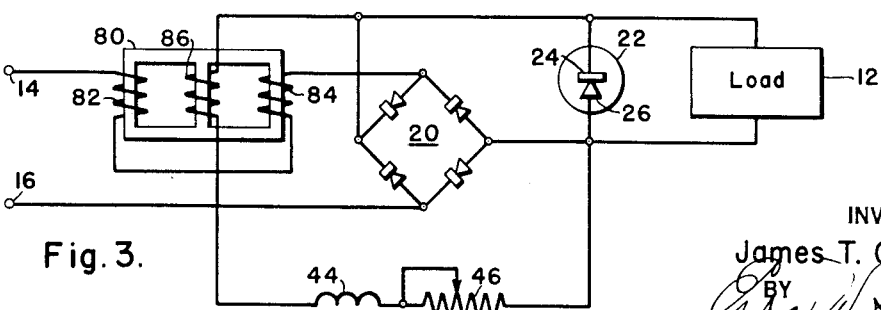
Fig. 3 is a schematic diagram of apparatus and circuits illustrating another embodiment of this invention.

Referring to Fig. 3 there is illustrated another embodiment of this invention in which like components of Figs. 1 and 3 have been given the same reference characters. The main distinction between the apparatus illustrated in Figs. 1 and 3 is that in the apparatus of Fig. 3, a three legged magnetic core member 80 is used in place of the two magnetic core members 30 and 32 illustrated in Fig. 1.

As illustrated, load windings 82 and 84 are disposed in inductive relationship with the outer legs of the core member 80. In order to render the rectifier 20 responsive to the alternating current flowing through the load windings 82 and 84, the load windings 82 and 84 are connected in circuit relationship with the rectifier 20. In particular, the load windings 82 and 84 are connected in series circuit relation with one another, one end of the series circuit being connected to the input terminal 14 and the other end of the series circuit being connected to one of the input terminals of the rectifier 20. The other input terminal of the rectifier 20 is connected to the input terminal 16 of the reference network 10.

A control winding 86 is disposed in inductive relationship with the middle leg of the core member 80 and is connected in series circuit relationship with the inductance member 44 and the resistor 46, the series circuit being connected across the P-N junction diode 22. It is to be noted that the alternating current ampere turns of the load winding 82 the alternating current ampere turns of the load winding 84 are each equal to the direct current ampere turns of the control winding 86 to thus effect a substantially constant current flow through the diode 22 to thereby maintain a substantially constant voltage across the diode 22 and across the load 12.

The operation of the apparatus illustrated in Fig. 3 can also be described by referring to the graph illustrated in Fig. 2. However, since the operation of the apparatus illustrated in Fig. 3 is substantially identical to the operation of the apparatus in Fig. 1, such a description is deemed unnecessary.

The apparatus embodying the teachings of this invention has several advantages. For instance, the reference network 10 maintains a substantially constant output voltage over a wide range of variation in the magnitude and frequency of its input voltage. Further, the output voltage of the refernce network 10 remains substantially constant even though there is variation in the magnitude of the temperature of the air surrounding the reference network. In addition, the reference network 10 embodying the teachings of this invention comprises static components which need not be periodically replaced. Therefore, the maintenance problem of such apparatus is a simple one.

Since numerous changes may be made in the above-described apparatus and circuits, and different embodiments of the invention may be made without departing from the spirit and scope thereof, it is intended that all the matter contained in the foregoing description or shown in the accompanying drawings shall be interpreted as illustrative and not in a limiting sense.

I claim as my invention:

1. In a voltage refernce network supplied from a source of alternating current, the combination comprising, a simple saturable reactor including magnetic core means, a load winding disposed in inductive relationship with the magnetic core means, and a control winding disposed in inductive relationship with the magnetic core means, a rectifier, circuit means for so interconnecting the rectifier and the load winding with the source of alternating current that the rectifier rectifies the alternating current flowing through the load winding, a P-N junction diode connected to the output of the rectifier, and other circuit means for connecting the control winding to the P-N junction diode so that the control winding is responsive to the voltage across the P-N junction diode, the ampere turns of the control winding being equal to the ampere turns of the load winding to thus give a substantially constant current flow through the P-N junction diode to thereby obtain a substantially constant voltage across the P-N junction diode over a wide range of variation in the magnitude and frequency of the voltage supplied by the source of alternating current and over a wide range of variation in the temperature of the air surrounding the voltage reference network.

2. In a voltage reference network supplied from a source of alternating current, the combination comprising, a simple saturable reactor including two magnetic core members, each magnetic core member having disposed in inductive relationship therewith a load winding and a control winding, a rectifier, circuit means for interconnecting the rectifier and the load windings with the source of alternating current so that the rectifier rectifies the alternating current flowing through the load windings, a P-N junction diode connected to the output of the rectifier, and other circuit means for connecting the control windings to the P-N junction diode so that the control windings are responsive to the voltage across the P-N junction diode, the direct current ampere-turns of each control winding being equal to the alternating current ampere-turns of its associated load winding to thus give a substantially constant current flow through the P-N junction diode to thereby obtain a substantially constant voltage across the P-N junction diode over a wide range of variation in the magnitude and frequency of the voltage supplied by the source of alternating current and over a wide range of variation in the temperature of the air surrounding the voltage reference network.

3. In a voltage reference network supplied from a source of alternating current, the combination comprising, a simple saturable reactor having a three-legged magnetic core member, each outer leg of said core member having a load winding disposed in inductive relationship therewith, a control winding disposed in inductive relationship with the middle leg of said core member, a rectifier, circuit means for interconnecting the rectifier and the load windings with the source of alternating current so that the rectifier rectifies the alternating current flowing through the load windings, a P-N junction diode connected to the output of the rectifier, and other circuit means for connecting the control winding to the P-N junction diode so that the control winding is responsive to the voltage across the P-N junction diode, the alternating current ampere-turns of each of the load windings being equal to the direct current ampere-turns of the control winding to thus give a substantially constant current flow through the P-N junction diode to thereby obtain a substantially constant voltage across the P-N junction diode over a wide range of variation in the magnitude and frequency of the voltage supplied by the source of alternating current and over a wide range of variation in the temperature of the air surrounding the voltage reference network.

4. In a voltage reference network supplied from a source of alternating current, the combination comprising, a simple saturable reactor including two magnetic core members, each magnetic core member having disposed in inductive relationship therewith a load winding and a control winding, a rectifier, circuit means for interconnecting the rectifier and the load windings with the source of alternating current so that the rectifier rectifies the alternating current flowing through the load windings, a germanium P-N junction diode connected to the output of the rectifier, a resistor, and other circuit means for interconnecting the control windings and the resistor with said diode so that the control windings are responsive to the voltage across said diode, the direct current ampere-turns of each control winding being equal to the alternating current ampere-turns of its associated load winding to thus give a substantially constant current flow through said diode to thereby obtain a substantially constant voltage across said diode over a wide range of variation in the magnitude and frequency of the voltage supplied by the source of alternating current and over a wide range of variation in the temperature of the air surrounding the voltage reference network.

5. In a voltage reference network supplied from a source of alternating current, the combination comprising, a simple saturable reactor having a three-legged magnetic core member, each outer leg of said core member having a load winding disposed in inductive relationship therewith, a control winding disposed in inductive relationship with the middle leg of said core member, a rectifier, circuit means for interconnecting the rectifier and the load windings with the source of alternating current so that the rectifier rectifies the alternating current flowing through the load windings, a germanium P-N junction diode connected to the output of the rectifier, a resistor, and other circuit means for interconnecting the control winding and the resistor with said diode so that the control winding is responsive to the voltage across said diode, the alternating current ampere-turns of each of the load windings being equal to the direct current ampere-turns of the control winding to thus give a substantially constant current flow through said diode to thereby obtain a substantially constant voltage across said diode over a wide range of variation in the magnitude and frequency of the voltage supplied by the source of alternating current and over a wide range of variation in the temperature of the air surrounding the voltage reference network.

6. In a voltage reference network supplied from a source of alternating current, the combination comprising, a simple saturable reactor including two magnetic core members, each magnetic core member having disposed in inductive relationship therewith a load winding and a control winding, a rectifier, circuit means for interconnecting the rectifier and the load windings with the source of alternating current so that the rectifier rectifies the alternating current flowing through the load windings, a silicon P-N junction diode connected to the output of the rectifier, a resistor, and other circuit means for interconnecting the control windings and the resistor with said diode so that the control windings are responsive to the voltage across said diode, the direct current ampere-turns of each control winding being equal to the alternating current ampere-turns of its associated load winding to thus give a substantially constant current flow through said diode to thereby obtain a substantially constant voltage across said diode over a wide range of variation in the magnitude and frequency of the voltage supplied by the source of alternating current and over a wide range of variation in the temperature of the air surrounding the voltage reference network.

7. In a voltage reference network supplied from a source of alternating current, the combination comprising, a simple saturable reactor having a three-legged magnetic core member, each outer leg of said core member having a load winding disposed in inductive relationship therewith, a control winding disposed in inductive relationship with the middle leg of said core member, a rectifier, circuit means for interconnecting the rectifier and the load windings with the source of alternating current so that the rectifier rectifies the alternating current flowing through the load windings, a silicon P-N junction diode connected to the output of the rectifier, a resistor, and other circuit means for interconnecting the control winding and the resistor with said diode so that the control winding is responsive to the voltage across said diode, the alternating current ampere-turns of each of the load windings being equal to the direct current ampere-turns of the control winding to thus give a substantially constant current flow through said diode to thereby obtain a substantially constant voltage across said diode over a wide range of variation in the magnitude and frequency of the voltage supplied by the source of alternating current and over a wide range of variation in the temperature of the air surrounding the voltage reference network.

References Cited in the file of this patent

UNITED STATES PATENTS

| | | |
|---|---|---|
| 2,383,722 | Haug | Aug. 28, 1945 |
| 2,503,880 | Mah | Apr. 11, 1950 |
| 2,697,197 | Brown | Dec. 14, 1954 |